Figure 1:
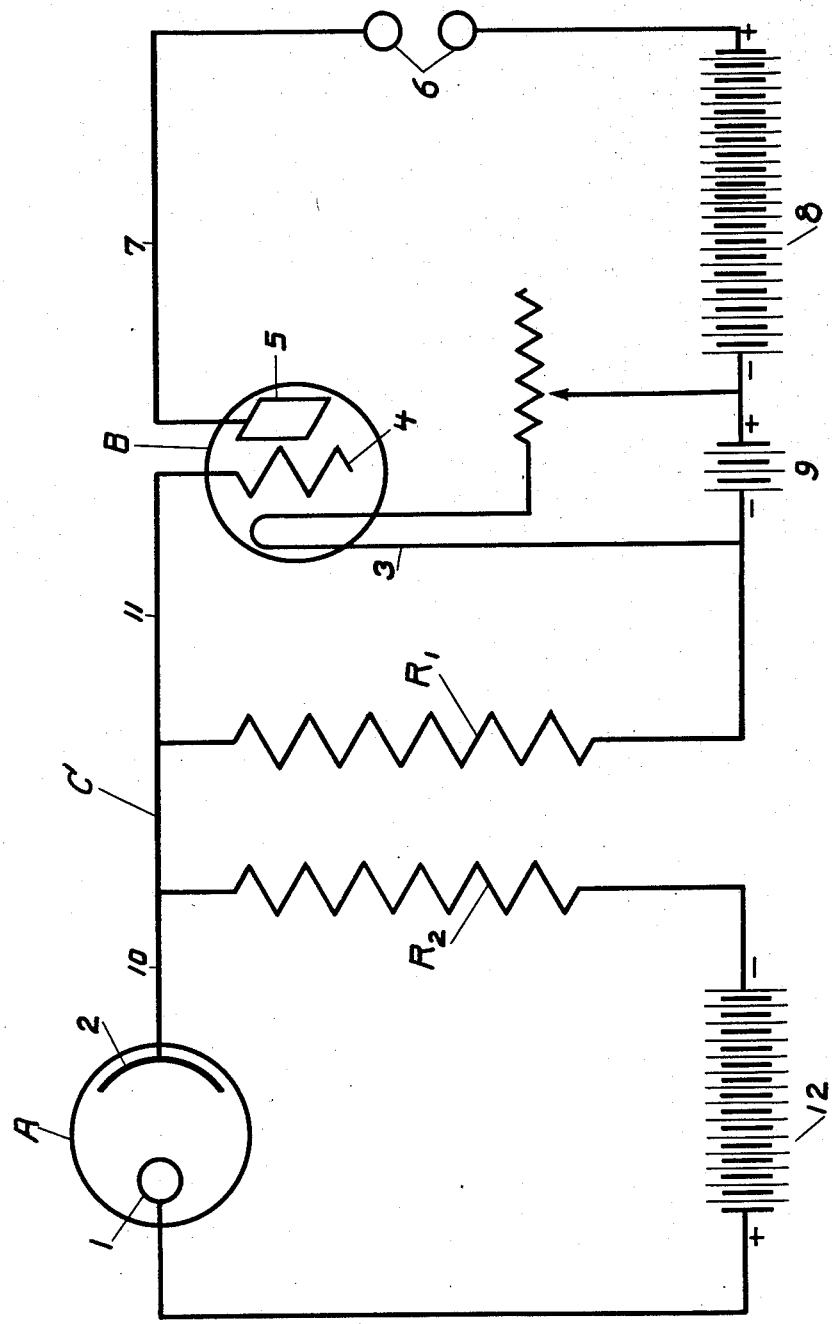

Patented Feb. 28, 1933

1,899,712

UNITED STATES PATENT OFFICE

THEODORUS H. NAKKEN, OF BROOKLYN, NEW YORK, ASSIGNOR TO NAKKEN PATENTS CORPORATION, A CORPORATION OF DELAWARE

ELECTROSTATIC POTENTIAL CONTROL FROM PHOTOELECTRIC CELLS

Application filed May 21, 1929. Serial No. 364,873.

This invention relates to the art of transforming light impulses into electric current impulses. Its object is to improve both the combination of instrumentalities and the instrumentalities themselves useful to this end.

Heretofore I have attempted to teach the art the importance of electro-static potential control in photo-electrics and have emphasized the importance of time as a factor. Although it is true that electricity flows at the speed of light, this truth applies only to the electron front that is flowing through any circuit and Ohm's law is applicable only to steady flows of current. There is a tendency in this art to disregard the primary causes of phenomena and to substitute in their place the effect of a primary cause as if it, the effect, were the causation. In this connection I refer particularly to the phenomena of fall of potential across a resistance. In any circuit in which a resistance is included and is carrying a steady current, there is a definite fall of potential across such resistance but there can be no increased flow of current across that resistance until there is applied to the opposite ends of the resistance an increased potential. It is the potential or electric pressure which causes the flow and not the flow which creates the potential. In many circuits in which rapidly changing conditions effect localized electro-static potential changes there may subsequently take place current flows which when they are established produce falls of potential corresponding to the change of potential measured by the electro-static potential change but in all such cases it is the change of potential which takes place first. It is, of course, a truth that for a change in electro-static potential to take place in an isolated electro-static system by reason of the inflow or outflow of electrons that it is the actual quantity of electricity or number of electrons which are caused to flow in or caused to flow out that effect the change of the electro-static potential. Over a given resistance and under the urge of a given difference of potential only one definite rate of flow of electricity can take place, that is, the quantity of electricity interchanged per unit of time is limited. If an electro-static system is under the influence as to its potential of two pathways for the inflow or outflow of electrons, one of which permits a very limited rate of inflow or outflow and the other of which permits a relatively great rate of inflow or outflow, then in that event it is the pathway which permits the relatively great rate of inflow or outflow which overbalances the effect of the smaller rate pathway and the potential is controlled by the differential or algebraic sum of these two rates of flow over any time interval.

In transforming light impulses which correspond to the light variations passing through a sound track on a motion picture sound record, time is of the essence. It is for that reason that the selenium cell with its sluggish characteristics was ineffective in the transformation of such light impulses into electric current impulses, and it is for the same reason that falls of potential across a resistance are ineffective and I have combined apparatus in such a way as to utilize the relatively instantaneous changes of electro-static potential in effecting my transformation of light impulses into electric current impulses.

In the circuits which are the subject of my present invention the resistance which is employed to limit the steady resupply or discharge of electrons to the appropriate electrode of a photo-electric couple is completely disconnected from a shunting or bridging relation between the cathode and the grid of the triode amplifier so that it is impossible for one so erroneously inclined to claim or assert that the controlling effect in response to the light impulses is by reason of a varying fall of potential across such resistance.

In this system which I have herein illustrated, however, the link means comprising the grid of the associated triode amplifier, the connected electrode of the photo-electric couple, and the entire electrical connector if it is in the form of a conductor, constitute an isolated electro-static system, the electric charge existing on which is itself varied by the light impulses substantially instantaneously. In the case in which the link means comprises a condenser, there are two isolated electro-static systems, one on the one side of the condenser and one on the other, the two systems being coupled by electro-static induction and functioning in accordance with the same principle. Of course, when the condenser is employed the relatively slow electron flow through the resistances employed is through one resistance for one of the electro-static systems and through the other resistance for the other electro-static system and for each system tends to maintain a mean or average condition, which mean or average is upset by the electron emission or reception shocks depending upon whether the cathode body is connected to the link means or the anode, which receives the electrons from the cathode body, is connected to the link means.

The above will be pointed out more in detail in the accompanying claims which are directed to illustrative embodiments of the invention described in the following specification in connection with the accompanying drawings which form a part hereof.

Figure 2:
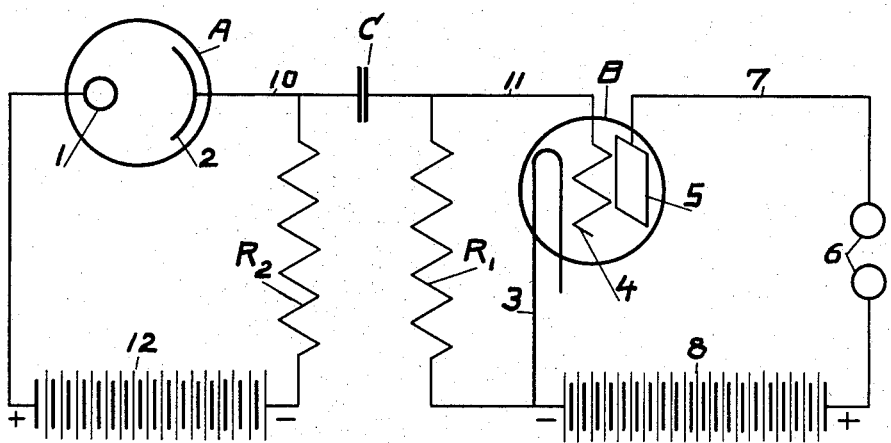
Figure 3:
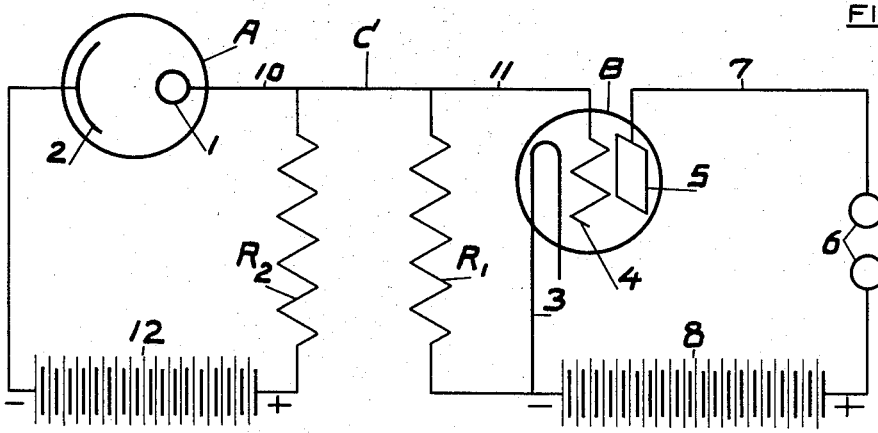

In the drawings, Fig. 1 is a diagram illustrating one form of my combination; Fig. 2 is a modification in which the link means comprises a condenser; Fig. 3 corresponds to Fig. 1 except that the exciting battery and the electro-couple are reversed; and Fig. 4 corresponds to Fig. 2 with the reversal mentioned in connection with Fig. 3.

A is any commercial photo-electric cell including the photo-electric couple comprising the anode 1 and the cathode body 2 which constitute the electrodes of the photo-electric couple. B is any form of thermionic triode amplifier including cathode 3, grid 4 and plate 5. 6 indicates any translating device for the plate circuit 7 over which the current impulses are adapted to traverse and has a supply of energy of any approved form such as the battery 8. The battery 9 serves as means for heating the cathode 3.

Figure 4:
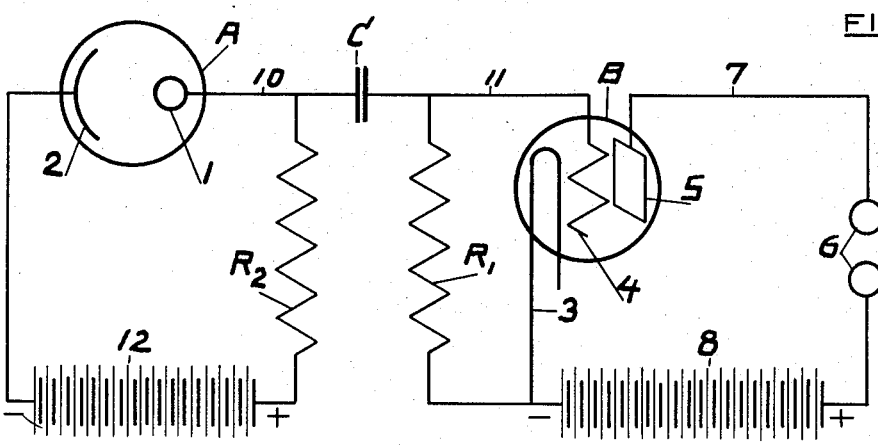

A link means C connects the grid 4 with one electrode of the photo-electric cell A in Figs. 1 and 2 with the cathode body 2, and in Figs. 3 and 4 with the anode 1.

A high resistance R—1 connects cathode 3 and grid 4 with the portion 11 of the link means C and a source of potential shown in the form of a battery 12 is preferably completely isolated and is suitably electrically connected plus to the anode 1 of photo-electric couple and minus to the cathode body 2. The pull of battery 12 which connects to the electrode of the photo-electric couple, which electrode is connected with the link means C preferably comprises a high resistance R—2. It is best to regulate or choose this resistance so as to tend to maintain an average normal electro-static potential for the part of the link means connected to it but which is incapable of maintaining such potential when a light shot is effecting electron emission from the cathode body 2. In Figs. 1 and 2 the resistance R—2 forms a part of the connection between the battery 12 and the link means portion 10 connected with the cathode body 2 while in Figs. 3 and 4 the resistance R—2 forms a part of the connection between the positive terminal of battery 12 and the portion 10 of the link means C which connects with the anode 1. In the circuit of Figs. 1 and 2 the resistance R—2 limits the re-supply of electrons to the electro-static system while in the circuits of Figs. 3 and 4 the resistance R—2 limits the rate of discharge of electrons from the electro-static system.

Obviously with the resistance R—2 connected only at one end to the grid 4 and with its other end free from connection with the cathode 3 there can be no claim that it is the fall of potential across the resistance R—2 which changes the potential between cathode 3 and grid 4.

What I claim and desire to secure by United States Letters Patent is:

1. In cooperative combination means for transforming light impulses into dynamic electric current impulses comprising a photo-electric couple comprising a cathode body and an anode and a thermionic triode amplifier comprising a cathode, a grid and a plate; a plate circuit for said triode amplifier including a translating device and a source of electrical energy and constituting a circuit in which current impulses are adapted to traverse; a link means electrically connecting one electrode of said photo-electric couple with the grid of said triode amplifier; a high resistance connecting said link means with the cathode of said triode amplifier; a local insulated source of potential having connections from opposite polarity points minus to the cathode of said photo-electric couple and plus to the anode of said photo-electric couple, the connection from said local source to the electrode of said photo-electric couple which is connected to said link means including a high resistance of a value having a limiting effect upon the rate of flow of electrons relatively to the average rate of electron emission of said cathode body under the influence of said light impulses, the end of said resistance opposite to the end connected to said link means being free from connection with the cathode of said triode amplifier.

2. The combination as characterized in claim 1 and further characterized by the fact that said link means comprises a condenser located between the points of attachment thereto of said resistances.

3. The combination as characterized in claim 1 and further characterized by the fact that said link means connects the cathode body of said photo-electric couple with the grid of said triode amplifier.

4. The combination as characterized in claim 1 and further characterized by the fact that said link means connects the cathode body of said photo-electric couple with the grid of said triode amplifier and includes a condenser located between the points of connection therewith of said resistances.

THEODORUS H. NAKKEN.